United States Patent [19]

Hyte et al.

[11] Patent Number: 4,750,428
[45] Date of Patent: Jun. 14, 1988

[54] FLOATING TURNTABLE FOR VEHICLES

[76] Inventors: Charles A. Hyte, 3029 Castle Heights Ave., Los Angeles, Calif. 90034; Stewart Wilcox, 7024-A Darby La., Reseda, Calif. 91335; Hadd S. Lane, 4925 River Rd., Bethesda, Md. 20816

[21] Appl. No.: 912,278

[22] Filed: Sep. 29, 1986

[51] Int. Cl.⁴ .................................................. B60S 13/02
[52] U.S. Cl. ........................................ 104/40; 104/44; 104/46; 104/47
[58] Field of Search ................. 104/35, 36, 37, 38, 104/39, 40, 41, 42, 43, 44, 45, 46, 47; 52/65

[56] References Cited

U.S. PATENT DOCUMENTS

| | | | |
|---|---|---|---|
| 3,075,654 | 1/1963 | Wheeler | 104/43 X |
| 4,019,292 | 4/1977 | Pedro | 52/65 |
| 4,608,929 | 9/1986 | Park | 104/44 |
| 4,716,837 | 1/1988 | Valencia | 104/38 |

Primary Examiner—Robert B. Reeves
Assistant Examiner—Joseph D. Pape

[57] ABSTRACT

A vehicle turntable is disclosed herein having flotation and bearing systems to reduce friction while turning. When a vehicle is being moved on or off of the turntable, the turntable tips into engagement with its base to support the eccentric load of the vehicle and to inhibit turning. Power controls for the turntable are operable from the driver's seat.

19 Claims, 2 Drawing Sheets

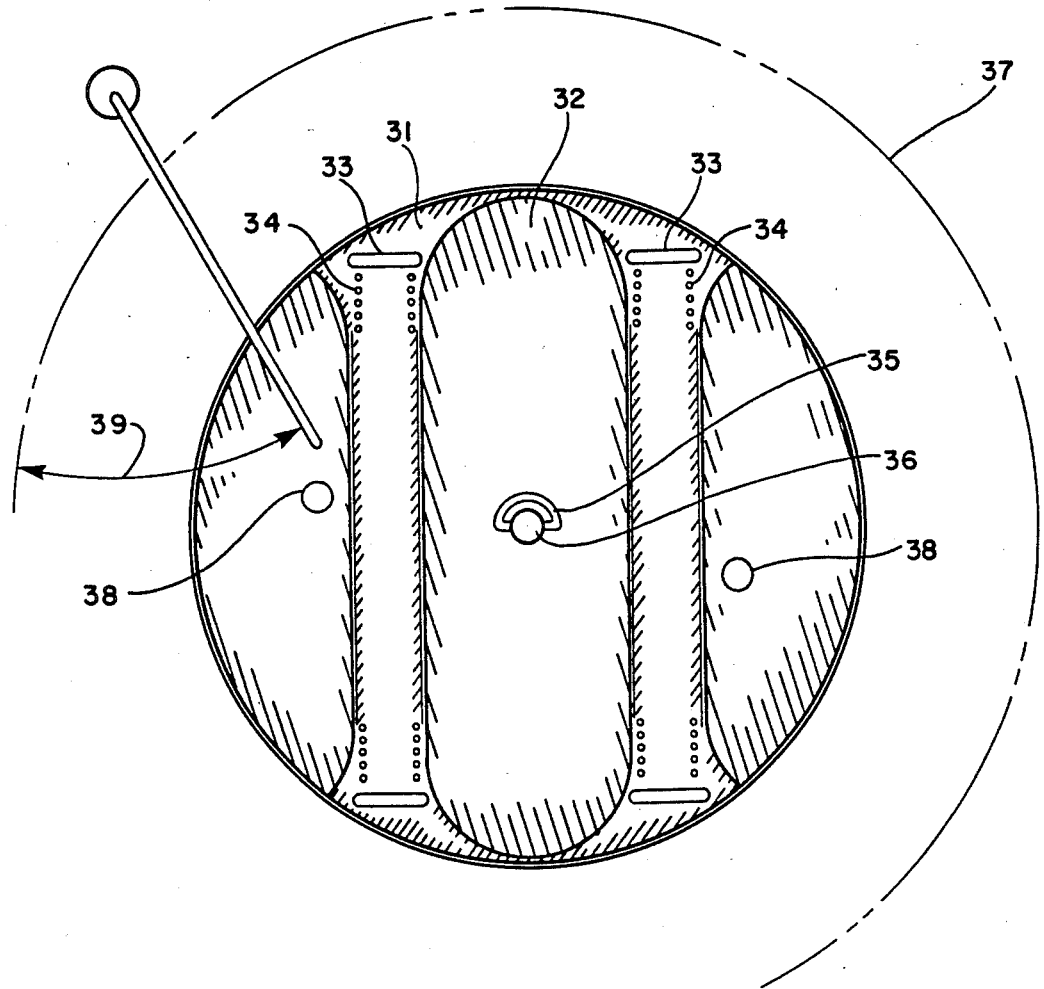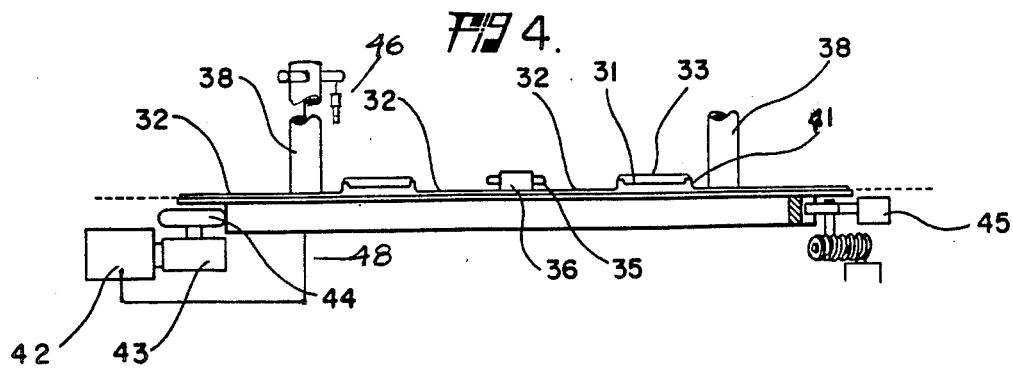

FLOATING TURNTABLE FOR VEHICLES

BRIEF DESCRIPTION OF NEED

As urban areas become more crowded, where narrow streets tend to congest traffic and where narrow lots and shrubbery restrict the vision of the driver, backing into traffic may be hazardous. In many instances, it is inconvenient and difficult to back in a long, narrow driveway, into traffic. The first inventor knows of three accidents involving backing into traffic. In some applications, a turntable supported by liquid floatation would be desirable. In others, the turntable would be supported by compressed liquid or air pad floatation.

BRIEF DESCRIPTION OF THE FIGURES

FIG. 3 is a top view of either of the above, also showing means of controlling the rotation by means of switches, valves or controls adjacent to the driver's position. FIG. 4 is a side view showing the position and installation relationship of the drive motor and latching means to be employed by any of the foregoing turntables.

DESCRIPTION OF PREFERRED EMBODIMENTS

Figure 1:
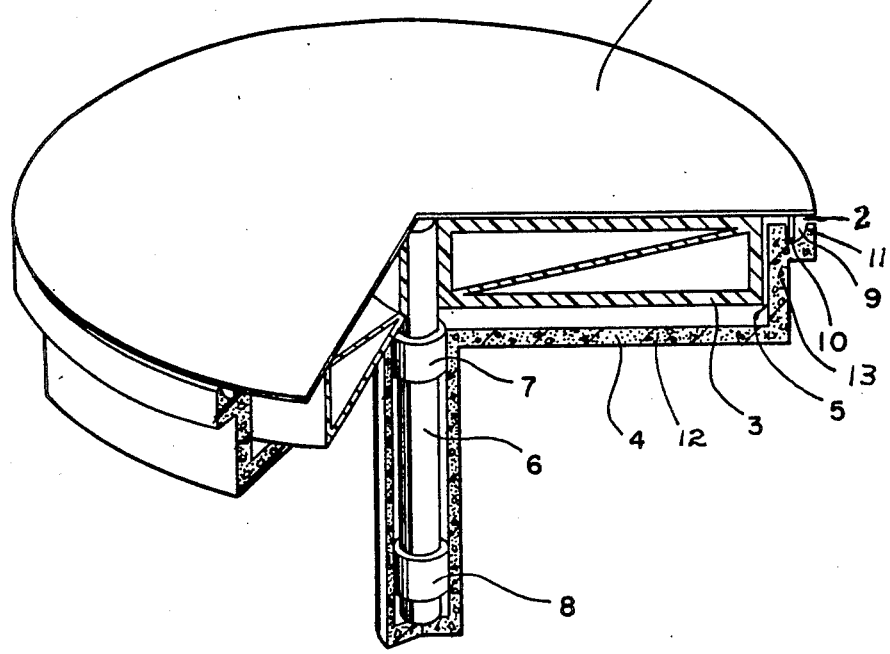
FIG. 1 shows a simple and direct flotation system with very little sinking as a load is applied to it and with a center shaft that maintains it level as a car drives on or off of it.

Many applications will be on sites where the soil is deep, so the installation of the centerpost 6 of FIG. 1, maintaining level of the float as cars drive on or off the float will not be difficult. Since the gap between the float 3 of FIG. 1 and its base or casing 4 is held to minimum, load on the float 3 causes a rapid rise of the liquid in the gap 5 relative to its sinking, so the float sinks only a very small amount relative to the actual displacement created by the weight of the car, or about 3/16 of an inch. Other elements of FIG. 1 are top details 1 of the float, detailed in FIG. 3. The bottom 12 of base 4, and side wall 13 with ledge 11 constitute a container for the liquid in which the float 3 is sustained by flotation. Float overhang 2 contacts ledge 11 which limits the sinking of the edge when the car drives on or off, due to the elasticity of the structure. Bearings 7 and 8 rotatably secure the shaft 6. A gutter 9 surrounds the unit to entrap water and dirt to maintain the inner area uncontaminated and maintain its liquid level, with suitable drain, not shown. A deflector 10 is attached to the table to assure that wind or water will not pass the gutter 9. This gutter too may maintain a minimum water level and will completely entrap any wind-blown dust or dirt. The contacting surfaces on overhang 2 and ledge 11 are of the usual high friction character: in this instance concrete and iron, or aluminum, as shown.

As the front or rear wheels of a heavy car first contact the edge of the turntable, the shaft 6 and other parts of the turntable top will flex downwardly at that edge so that closely spaced lip or overhang 2 contacts the stationary casing 4 and supports the eccentric load at this point. The friction between the overhang 2 of the top and the upper surface of ledge 11 inhibits any unwanted rotation of the turntable. When the car drives completely on to the turntable, the load becomes centered, so that the float may move downwardly and support the load by floatation alone. The table is now free to rotate in a substanially friction free manner. When the car is driven off the turntable, the overhang 2 again contacts the ledge 11 of the casing at the area of the drive-off to support and immobilizes the eccentric load, after which the turntable floats in a centered position ready for a car to be driven thereon from any direction.

Figure 2:
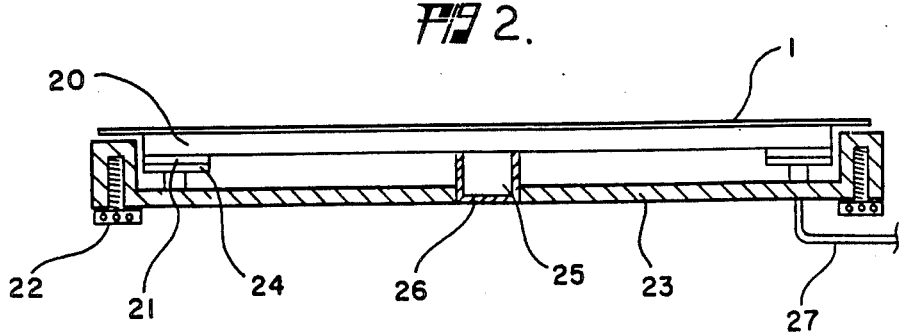
FIG. 2 shows a second floatation system depending upon pressurized fluid for its support and rotation, particularly suitable for temporary installations where the center post and/or depth/height of the floatation system and/or other characteristics would be objectionable.

FIG. 2 shows an alternate fluid-float system, employing multiple pressurized pads 24 to lift the turntable nearly friction free. The pads may operate from below up or from the table down, but we perfer the former, as its mating anulus 21, being above, is less apt to collect dirt and contamination to cause friction and unnecesary wear, and simplifying the installation of the pressurizing system tubes 27 by not requiring a rotating seal required when the pads are suspended downwardly from the table. The fluid employed may be either air or water under pressure, though in the latter case a drain must also be added. Shaft 25 is centrally fixed to the turntable and is journaled in central bearing 26 to radially position the top relative to pads 24. When the design of FIG. 2 is used for a portable system, adjusting and/or leveling screws 22 may be added to permit installation on an irregular surface. Both the pressurized pads 24 and the leveling screws 22 will be supplied in any desired multiple to accomodate the designed load.

FIG. 3 shows elements of the design of the top of the turntable, in which 31 is the properly supported treadway of the tires of the car 32 the remaining surface of the turntable that needs stressing only for foot traffic. Bars or sills 33 are adjustable for position in multiple holes 34, to alert the driver to correct positioning of the car to place it in balance on the turntable. 35 is a bail for easy installation or possible maintenance of the table with its associated attachment 36 to the table. 38 are flexible posts that may be installed on the top of the table, containing an extensible connection 46 to the car's cigarette lighter, when power for the rotation of the table is drawn from the vehicle's electric system. 39 illustrates an alternate system, when power is obtained from an existing external electrical system, as the home electric supply, which needs to be mounted on the ground beyond the car's overhang circle 37 as illustrated, or alternately, from the garage or house. The one illustrated, 39, mounted on the ground, swings to within easy reach of the driver when a car is driven upon it so he can actuate the turntable control mechanism from the driver's seat when his car is properly located on the turntable. Upon actuation, it either retracts upward or swings outward to avoid contact with the rotating car and marring its finish.

In FIG. 4, small curbs 41 keep the car properly aligned on the turntable. 42 is an electric, hydraulic or pneumatic drive motor, 43 a reduction gear box, and 44, a suitable friction drive wheel. 45 indicates the installation of a suitable latching means. Both concepts have been exposed in many prior patents and are now in public domain, but are important to the proper operation of the turntable.

When the vehicle's electrical system is utilized, an electrical conductor 48 will pass from connection 46, through the post 38 to the underside of the table to the motor 42, which, in this embodiment, will be wound to accept the vehicle's supply, which is usually 12 volts. D.C.

APPLICATIONS

The foregoing descriptions illustrate the great flexibility for installation of driveway and other turntables in the various conditions that will be encountered commercially, as well as portable turntables designed primarily for the exhibiting of cars or goods. Varying conditions of soil depth, sloping drives, multiple garaging spaces and other variables can readily be met with one of the preceding designs. Since these turntables are practically friction free, they may be readily actuated by hand. However, this requires getting out of the car, unlatching the table, rotating the car, then re-entering the car to drive away. The automatic rotation and latching of the turntable we expect to be a popular option to the turntable, and either of the above control systems can readily accomodate any customer's needs. Posts 38 of FIG. 3 are designed flexible so that if inadvertently struck by the car or its load no damage to the post will result.

In both embodiments, an automobile or other vehicle may be driven either forwardly or backwardly onto the turntable, the turntable then rotated to the desired orientation of the vehicle and the vehicle then driven off, either forwardly or backwardly, the turntable being inhibited against motion by friction when the vehicle is moving on or off the turntable, but being free otherwise.

We claim:

1. A vehicle turntable for a roadway, comprising a top and a base, said base to be set into said roadway, said top having a vehicle pathway, constituting a continuation of said roadway when in alignment therewith, and float supporting means for said top in said base whereby said top may be rotated in a substantially friction free manner to a different alignment of said path and roadway when said vehicle is centrally received on said top, said base including a ledge with an upper friction surface beneath and closely spaced from said top, whereby said top tips into frictional contact with said ledge and rotation is inhibited by friction as said vehicle is being driven on or off said top, but is free of said ledge when said vehicle is centrally received on said top.

2. The turntable of claim 1 wherein said supporting means comprises a liquid container in said base and a float joined to said top, to be immersed in liquid in said container.

3. The turntable of claim 2 wherein said container is substantially cylindrical and the float slightly smaller than said container wherein a small downward displacement of said top causes a large rise in said liquid.

4. The turntable of claim 2 wherein there is means to rotate said top through a desired angle.

5. The turntable of claim 4 wherein said means to rotate comprises a motor and a control means for said motor, said control means being moveable from a position adjacent a driver of said vehicle when fully received on said turntable top to a position beyond said vehicle when turning with said top.

6. The turntable of claim 4 wherein said means to rotate said top is an electric motor including conductors therefor readily connectable to the electric power of said vehicle.

7. The turntable of claim 2 wherein there is a vertical central shaft attached to said top and mounted in vertical bearings at the center of said container.

8. A vehicle turntable comprising a top and a base, said base being adapted to be set in a roadway whereby said vehicle may be driven onto, received on, and driven off said top, and float supporting means in said base for said top to permit said top to be rotated in a substantially friction free manner when said vehicle is fully received thereon, said float supporting means comprising a plurality of fluid pressure pads centered by a central bearing that radially positions said top relative to said pads.

9. The turntable of claim 8 wherein there is a plurality of adjusting elements on the lower face of said base to adjust the turntable to said roadway.

10. A turntable for a vehicle comprising a turntable top adapted to fully receive a vehicle, a base therefor having an upper ledge beneath and closely spaced from said top, means supporting said top from said base and sustaining said top when the vehicle is fully received thereon and permitting substantially friction free rotation of said top from one position to another, said top and support means being yieldable to the eccentric load when a vehicle is being moved onto or off said top so that said top tips into direct contact with said ledge, is partly supported thereby, and said rotation inhibited.

11. The turntable of claim 10 wherein said means supporting said top includes a vertical central shaft mounted in bearings at the center of said base.

12. The turntable of claim 10 wherein said top contacts said ledge with sliding friction.

13. The turntable of claim 10 wherein there is means to rotate said top from one position to another including an electric motor with conductors therefor having means to readily connect to the electric power of said vehicle.

14. The turntable of claim 10 wherein there is means including a motor to rotate said top from one position to another, control means for said motor, said control means being movable from a position adjacent the driver of said vehicle when fully received on said top to a position beyond said vehicle when turning with said top.

15. A method of oreienting a vehicle normally movable along a linear path only comprising the steps of moving the vehicle into initial contact with the edge of a turntable top, tilting said top by the eccentric weight of said vehicle onto a supporting ledge located beneath, close to and near the edge of said top, moving said vehicle to the central region of said top and removing said tilt, rotating said top to a position where the vehicle is at the desired orientation, moving said vehicle off said top and again tilting said top onto a supporting ledge as it is so moved.

16. The method of claim 15 with the further step of supporting said top by means including a vertical shaft mounted in bearings secured to the center of the turntable.

17. The method of claim 16 wherein the said tilting is achieved by flexing the shaft and the top.

18. The method of claim 15 wherein the said rotation is achieved by an electric motor; the further step of connecting said motor to the electrical power system of said vehicle.

19. The method of claim 15 wherein the said rotation is achieved by a motor; the further step of controlling said motor by a movable controller, and moving said controller between positions adjacent the driver of the vehicle when fully received on said top and beyond said vehicle when turning with said top.

* * * * *